(12) United States Patent
Chen et al.

(10) Patent No.: US 9,399,582 B2
(45) Date of Patent: Jul. 26, 2016

(54) CATALYST FOR PREPARING PHOSGENE AND METHOD FOR PREPARING PHOSGENE USING THE SAME

(71) Applicants: WANHUA CHEMICAL GROUP CO., LTD., Shandong (CN); WANHUA CHEMICAL (NINGBO) CO., LTD., Zhejiang (CN)

(72) Inventors: Bin Chen, Shandong (CN); Wuxi Luo, Shandong (CN); Yu Yao, Shandong (CN); Liangfeng Shao, Shandong (CN); Lei Wang, Shandong (CN); Hongke Zhang, Shandong (CN); Weiqi Hua, Shandong (CN)

(73) Assignee: Wanhua Chemical (Ningbo) Co., Ltd., Zhejiang (CN)

( * ) Notice: Subject to any disclaimer, the term of this patent is extended or adjusted under 35 U.S.C. 154(b) by 0 days.

(21) Appl. No.: 14/904,138

(22) PCT Filed: Feb. 11, 2014

(86) PCT No.: PCT/CN2014/071969
§ 371 (c)(1),
(2) Date: Jan. 11, 2016

(87) PCT Pub. No.: WO2015/027686
PCT Pub. Date: Mar. 5, 2015

(65) Prior Publication Data
US 2016/0137511 A1    May 19, 2016

(30) Foreign Application Priority Data

Aug. 26, 2013   (CN) .......................... 2013 1 0375888

(51) Int. Cl.
| | |
|---|---|
| *C07C 51/58* | (2006.01) |
| *C01B 31/28* | (2006.01) |
| *B01J 27/224* | (2006.01) |
| *B01J 21/18* | (2006.01) |
| *B01J 35/00* | (2006.01) |
| *B01J 35/02* | (2006.01) |
| *B01J 37/02* | (2006.01) |
| *B01J 37/08* | (2006.01) |

(52) U.S. Cl.
CPC .................. *C01B 31/28* (2013.01); *B01J 21/18* (2013.01); *B01J 27/224* (2013.01); *B01J 35/0006* (2013.01); *B01J 35/023* (2013.01); *B01J 37/0236* (2013.01); *B01J 37/08* (2013.01)

(58) Field of Classification Search
CPC ......... C01B 31/28; B01J 27/18; B01J 27/224; B01J 35/0006; B01J 35/023; B01J 37/0236; B01J 37/08
USPC .......................................................... 562/847
See application file for complete search history.

(56) References Cited

U.S. PATENT DOCUMENTS

| | | | |
|---|---|---|---|
| 4,231,959 | A | 11/1980 | Obrecht |
| 4,764,308 | A | 8/1988 | Sauer et al. |
| 6,054,107 | A | 4/2000 | Cicha et al. |
| 2002/0141923 | A1 | 10/2002 | Kittrell et al. |

FOREIGN PATENT DOCUMENTS

| | | | |
|---|---|---|---|
| CN | 1223623 A | | 7/1999 |
| CN | 1765740 A | | 5/2006 |
| CN | 102814188 A | * | 12/2012 |
| EP | 0 134 506 A2 | | 3/1985 |
| WO | WO 2012/177211 A1 | | 12/2012 |

OTHER PUBLICATIONS

International Search Report (PCT/ISA/210) issued on Jun. 3, 2014, by the Chinese Patent Office as the International Searching Authority for International Application No. PCT/CN2014/071969.

* cited by examiner

*Primary Examiner* — Deborah D Carr
(74) *Attorney, Agent, or Firm* — Buchanan Ingersoll & Rooney PC

(57) ABSTRACT

The present invention relates to a catalyst for preparing phosgene and a method for preparing phosgene using the catalyst. Said method comprises: modifying the surface of an activated carbon coating/foamed silicon carbide structural catalyst using an alkali metal salt; filling the catalysts having different thickness of the activated carbon coating and different amount of the alkali metal salt in different sections in the axial direction of the multi-tubular reactor of the fixed bed, and preparing phosgene using $Cl_2$ and CO. The radial and axial temperature difference of the catalyst bed is lowered by using the alkali metal salt-modified activated carbon coating/foamed silicon carbide structural catalyst and by segmental filling, so that high temperature of tube wall is obtained in the case of a larger tube diameter, and high quality of steam is obtained stably.

9 Claims, 5 Drawing Sheets

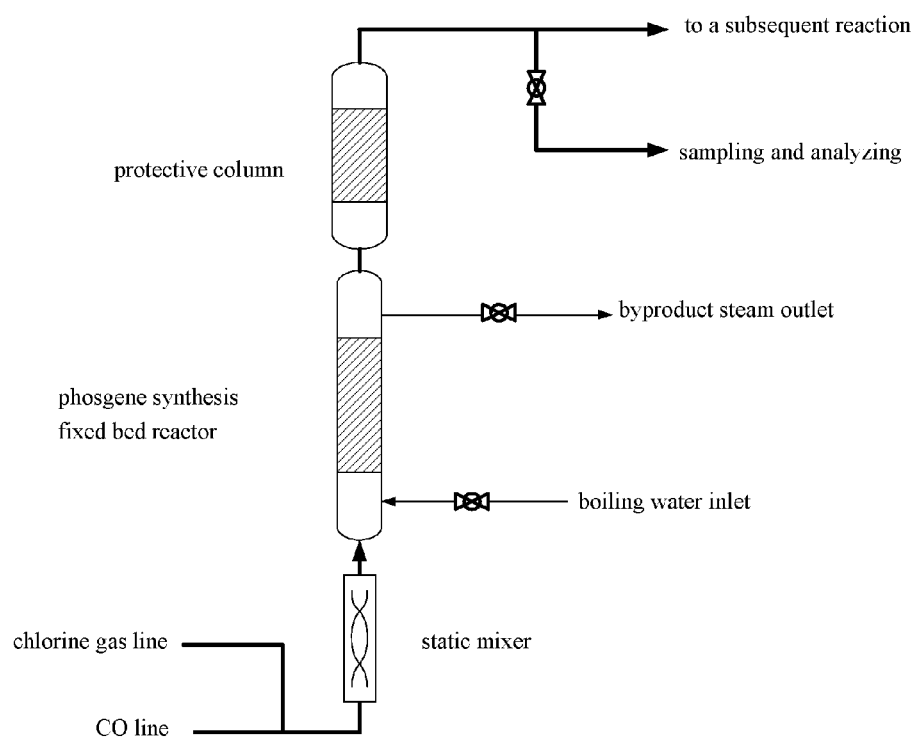
Figure 1 : The flow chart of the continuous process of the phosgene synthesis reaction

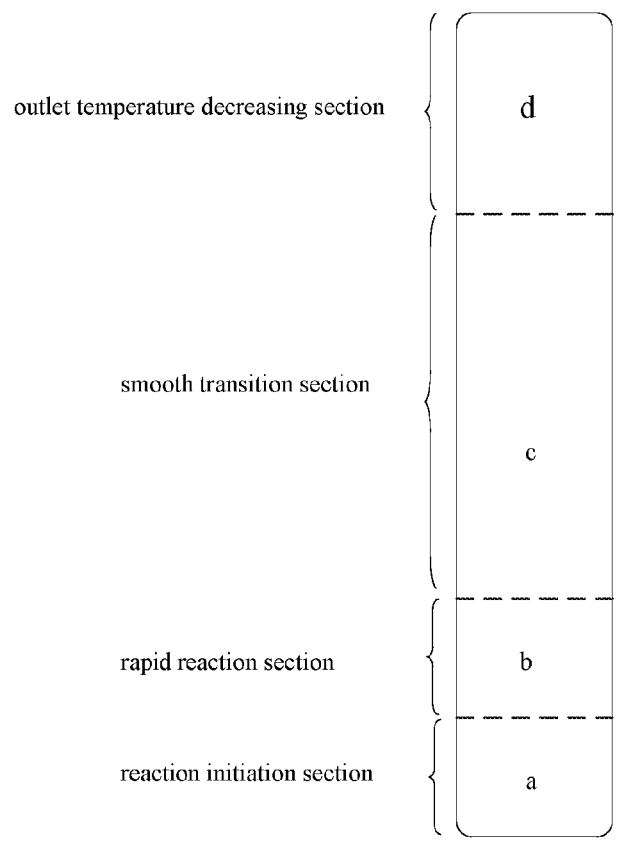
Figure 2: The schematic diagram of filling the alkali metal salt-modified activated carbon coating/foamed silicon carbide structural catalyst in the tube of the fixed bed

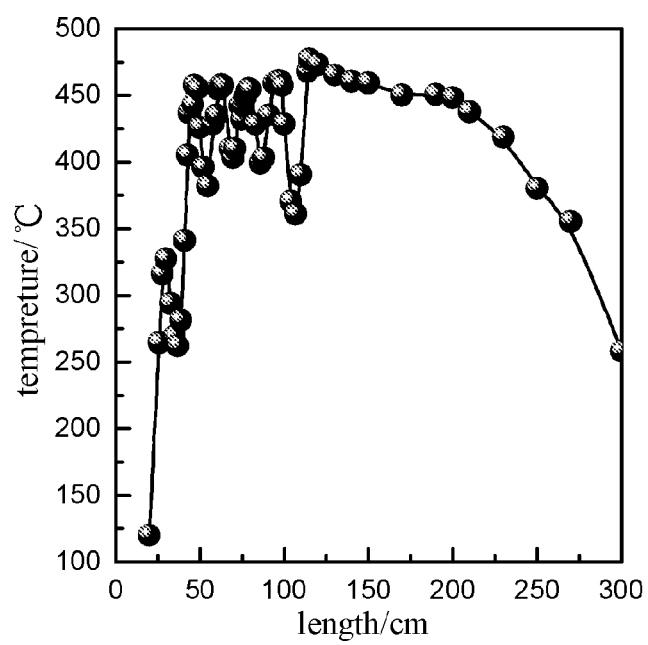
Figure 3: The schematic diagram of the temperature change in the tube of the fixed bed of Example 4

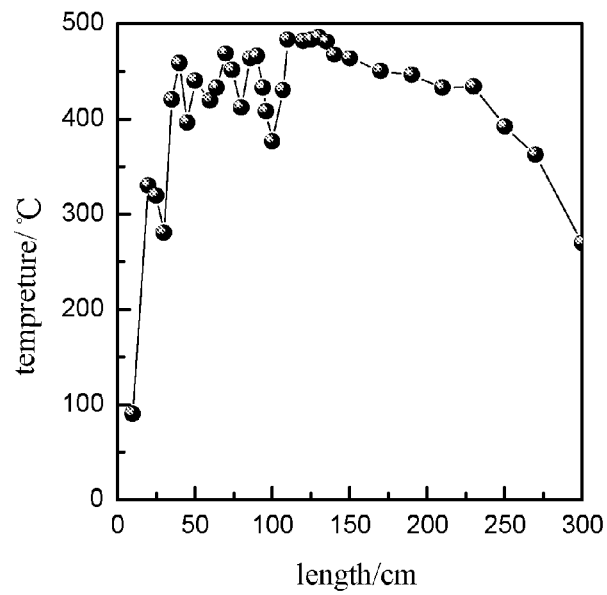
Figure 4: The schematic diagram of the temperature change in the tube of the fixed bed of Example 5
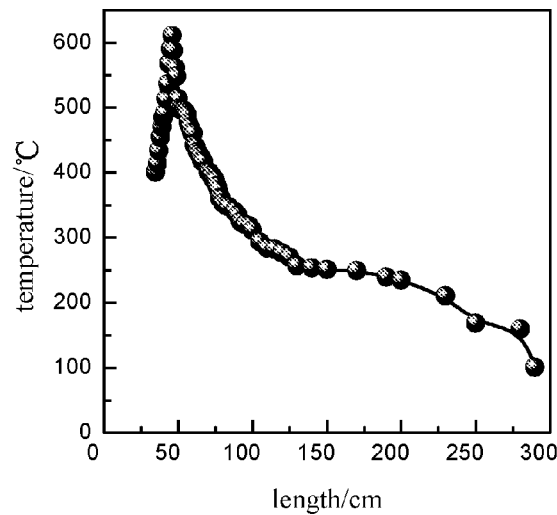
Figure 5: The schematic diagram of the temperature change in the tube of the fixed bed of Comparative Example 1

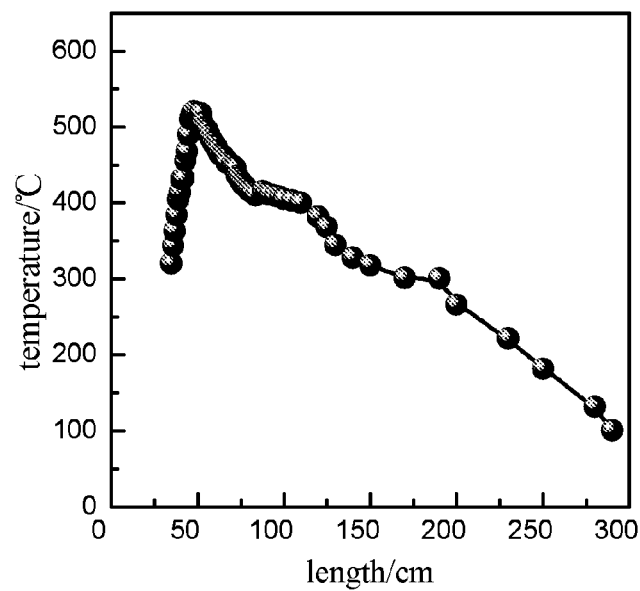
Figure 6: The schematic diagram of the temperature change in the tube of the fixed bed of Comparative Example 2

CATALYST FOR PREPARING PHOSGENE AND METHOD FOR PREPARING PHOSGENE USING THE SAME

FIELD OF THE INVENTION

The present invention relates to the field of preparing phosgene, and more particularly to a catalyst for preparing phosgene and a method for preparing phosgene using the same.

BACKGROUND OF THE INVENTION

Phosgene is one of the important organic intermediates, and can be used in the fields of agrichemicals, medicines, engineering plastics, polyurethanes, military uses etc. It is particularly the important raw material for producing isocyanates and polycarbonates.

Phosgene is synthesized by using carbon monoxide and chlorine gas as the raw materials, activated carbon as catalyst in the industry. The reaction equation is showed as formula (1):

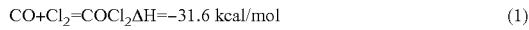

$$CO+Cl_2=COCl_2 \Delta H=-31.6 \text{ kcal/mol} \tag{1}$$

High quality of phosgene is primarily provided for high-end product use. For example, for phosgene used to prepare polycarbonates, the presence of free chlorine has problems such as adverse effects on water washing and severe equipment corrosion, thus at most 50 ppm free chlorine is allowed to be contained in said phosgene; and the presence of carbon tetrachloride impurity has problems such as adverse effects in the color quality of product, thus at most 50 ppm carbon tetrachloride is allowed to be contained in said phosgene.

It can be seen from the above formula that the reaction is a very strong exothermic process, and the calories produced in the production of 1 ton phosgene are more than 300,000 kcal. In the current industry, the part of heat is transferred by chlorobenzene and circulating water, and is naturally dissipated. As such, the considerable amount of reaction heat is wasted, and the high equipment and utility cost is additionally needed. Only low-grade steam is produced even though the reaction heat can be utilized. The above-said reaction can be rapidly conducted under the action of a catalyst at ambient temperature, and releases a large amount of heat. The released heat can further accelerate the reaction speed. If the reaction speed is further accelerated, more heat will be released, which leads to a vicious cycle.

At present, the catalyst for phosgene synthesis used in the industrial fixed bed reactor is columnar activated carbon particles. The mode of catalyst packing is primarily the traditional sectional filling (or packing) mode of "inert agent+ active catalyst+inert agent". The traditional filling method not only fails to lower the reaction rate and the rate of heat release near the feed inlet to prevent temperature runaway happening, but also it may decrease the effective utilization of the active catalyst. Therefore, for the phosgene synthesis reaction, the inlet temperature of the fixed bed reactor may rise rapidly, and the temperature of the hottest spot may reach 550~700° C. Since the content of free chlorine reduced rapidly in this period, the reaction rate will lower sharply, causing the reaction temperature to decrease rapidly. Thus, the fixed bed reactor would have a big change in the axial temperature gradient, resulting in the catalytic performance of the overall catalyst bed decreased, the uneven temperature of the heat transfer medium moved upwardly in the shell-side axial direction and the equipment material waste. And at such a high reaction temperature, long-term running will result in carbonization, pulverization of the activated carbon catalyst, so that eventually most activated carbon catalyst loses.

Since there are a large number of irregular open pores and closed pores in the interior of the activated carbon catalyst, the heat transfer effect of the activated carbon is very poor. Therefore, the radial temperature difference in the activated carbon catalyst bed layer is very big, and for a reaction tube having the inner diameter of 50 mm, the radial temperature difference may reach 300~400° C. As such, in the course of the reaction, the failure in the control of feeding, heat removing and the like would be very easy to cause a sharp temperature rise of the catalyst bed layer, which accelerates burning, pulverization of the catalyst. Further, the burning of the catalyst would lead to lowering of the pressure drop across the bed and make more material enter into the area where the lowering of the pressure drop took place, and therefore the reaction would be further out of control, which might result in a serious safety accident.

At present, the industrial apparatus of phosgene synthesis mainly use those having low to medium-boiling point such as water, salt-free water and so on as the heat transferring medium. The heat transferring medium removes large amount of heat by circulating in the shell-side of the fixing bed reactor. The process of using the high boiling point mediums for producing vapor by vaporizing or producing steam directly by vaporizing the boiling water to remove the reaction heat and eliminate the reaction hot spots of the fixing bed reactor shall be employed. See for example EP134506, U.S. Pat. No. 4,231,959, CN200510093948.7 etc. Only Bayer Corporation used the above-said process in the industry up to now. However, the steam by-produced in the process has low quality, and the lifetime of the activated carbon catalyst is short. This is because the activated carbon catalyst has high heat resistance, such that the overall reaction bed has high temperature and heat can not be removed. Thus, if the problem of high temperature gradient in the catalyst bed, especially the problem of the high radial temperature gradient, can not be solved, the heat produced in the reaction will be difficult to be comprehensively utilized.

Meanwhile, it needs to ensure that the heat transfer coefficient is as large as possible to dissipate heat safely and uniformly, such that the conversion rate of free chlorine in the exit is maintained. If the heat transfer medium is water, it needs to solve the safety problem of leakage of the heat transfer medium to the reaction region due to the local high temperature corrosion damage, otherwise, this will affect stable operation of the apparatus adversely. If the heat transfer medium is organics, the heat transfer effect is poor, and it needs to solve the problems such as carbonization of the heat transfer medium in the shell-side at high temperature to cause clogging, difficulty of cleaning the resulting carbides and so on, otherwise this will affect stable operation of the apparatus.

As described above, the prior art methods for preparing phosgene by the catalytic reaction of carbon monoxide and chlorine gas mainly have the problems as follows: serious carbonization and pulverization of the existing activated carbon catalysts, short life time, large radial and axial temperature difference, low quality of phosgene and the by-produced steam, failure to long-term stable operation, high maintenance cost, poor safety etc. Therefore, there is a need to find a new production method to replace the existing process.

SUMMARY OF THE INVENTION

It is an object of the present invention to provide a catalyst for preparing phosgene and a method of preparing phosgene using said catalyst. The method can lower the radial and axial temperature difference of the reactor effectively, reduce the carbonization and pulverization of the catalyst in the case of high temperature operation, and prolong the life time of the catalyst. Meanwhile, the method can obtain high quality of phosgene and the byproduct steam, reduce the equipment investment cost and the maintenance cost of stable operation, and prolong the safe operation cycle of the apparatus.

The technical solution of the present invention used to achieve the above-said object is described as below.

The activated carbon coating/foamed silicon carbide structural catalyst described in the present invention uses that prepared by The Institute of Metal Research, Chinese Academy of Sciences, and for its preparation method, sees paragraph [0010] of page 1~paragraph [0015] of page 2 of the description of CN201210306110.1.

The present invention provides a catalyst for preparing phosgene, said catalyst is an alkali metal salt-modified activated carbon coating/foamed silicon carbide structural catalyst, and the activated carbon coating has the thickness of 0~800 µm, preferably 0.1~300 µm.

The alkali metal salt-modified activated carbon coating/foamed silicon carbide structural catalyst of the present invention contains an alkali metal salt in the surface, and the amount of said alkali metal salt is 0.01~100 g/L, preferably 0.3~30 g/L, based on the volume of the catalyst.

Said alkali metal salt is one or more selected from chlorides, nitrates and sulfates, preferably sodium chloride and/or potassium chloride.

The method for preparing the alkali metal salt-modified activated carbon coating/foamed silicon carbide structural catalyst of the present invention comprises: immersing the activated carbon coating/foamed silicon carbide structural catalyst in the aqueous solution of the alkali metal salt, taking the catalyst out and drying; calcining the dried catalyst at 400~500° C. for 1~2 hours under nitrogen atmosphere, thereby obtaining the alkali metal salt-modified activated carbon coating/foamed silicon carbide structural catalyst.

The aqueous solution of the alkali metal salt has the concentration of 0.5~2 mol/L, preferably 0.8~1.5 mol/L.

The present invention also provides a method for preparing phosgene, comprising: Packing the alkali metal salt-modified activated carbon coating/foamed silicon carbide structural catalyst into a (multi-tubular) fixed bed reactor, mixing carbon monoxide and chlorine gas well in a mixer, putting the resulting mixture into the fixed bed reactor and making the mixture react under the action of the catalyst to prepare phosgene, wherein the reaction heat is removed by the heat transfer medium in the shell-side, the resultant exhaust gas is discharged from the outlet of the fixed bed reactor, and further reacting the exhaust gas in a protective column to ensure that the content of free chlorine in the exhaust gas from the outlet of the protective column is ≤50 ppm, the content of carbon tetrachloride is ≤50 ppm.

The catalyst is packed in the fixed bed reactor in section, as such, the multi-tubular reactor of the fixed bed, from bottom to top of the reactor in the axial direction of the same, is divided as: a reaction initiation section (1), a rapid reaction section (2), a smooth transition section (3), and an outlet temperature decreasing section (4). Said reaction initiation section (1) is aimed at initiating the phosgene synthesis reaction, and its length is 10~20% of the total length of the tubes. In the reaction initiation section (1), the thickness of the activated carbon coating is 0~300 µm, preferably 50~200 µm, and the amount of the alkali metal salt is 0.1~5 g/L, preferably 0.3~1 g/L, based on the volume of the catalyst. Said rapid reaction section (2) is the section having the highest speed of the phosgene synthesis reaction, and in the section, a large amount of heat is released from the reaction, the reaction speed is rapid, and the heat spots are easily formed in this section. The length of the rapid reaction section is 10~20% of the total length of the tube, wherein the thickness of the activated carbon coating is 0~100 µm, preferably 0.1~50 µm, and the amount of the alkali metal salt is 10~30 g/L, preferably 20~30 g/L, based on the volume of the catalyst. Said smooth transition section (3) is aimed at continuing the phosgene synthesis reaction at high temperature, increasing the effective utilization ratio of the activated carbon catalyst, reducing the axial temperature difference, and improving the reaction heat utilization rate. The length of the smooth transition section is 40~50% of the total length of the tube, wherein the thickness of the activated carbon coating is 50~300 µm, preferably 100~200 µm, and the amount of the alkali metal salt is 5~20 g/L, preferably 5~15 g/L, based on the volume of the catalyst. Said outlet temperature decreasing section (4) is aimed mainly at lowering the outlet reaction temperature and further increasing the reaction conversion rate. The length of the outlet temperature decreasing section is 20~30% of the total length of the tube, wherein the thickness of the activated carbon coating is 0~300 µm, preferably 50~100 µm, and the amount of the alkali metal salt is 0.5~10 g/L, preferably 1~5 g/L, based on the volume of the catalyst.

The volume ratio of carbon monoxide and chlorine gas in the present invention is 1~1.05:1. Said mixer is a jet mixer, an ejector mixer, an orifice plate mixer, etc., such as SMV type available from Sluzer Corporation.

The reaction pressure of the fixed bed reactor in the present invention is 0~0.4 MPa, preferably 0.1~0.35 MPa.

The pressure described in the present invention is based on gauge pressure.

The heat transfer medium of the present invention comprises boiling water or high boiling organics, wherein the high boiling organics comprise carbon tetrachloride, chlorobenzene, ortho-dichlorobenzene, toluene etc., preferably boiling water. Vapor is produced by the phase change of the boiling water or other boiling organics in the shell-side of the fixed bed reactor. Since the heat absorbed by vaporization is much larger than the heat absorbed by temperature rising of liquid, the radial temperature difference of the bed can be reduced, which ensures the heat released in the course of the reaction is rapidly removed, at the same time, the bubbling at the tube wall of the shell-side further reinforces the conduction of the heat produced in the reaction and eliminates the hot spots in the bed.

When the activated carbon coating/foamed silicon carbide structural catalyst used in the present invention has operated for a long time at high temperature, the active component of the catalyst, i.e., the activated carbon may lose or become pulverized. On the one hand, by introducing the alkali metal salt on the surface of the catalyst, if at high temperature, the alkali metal salt is melted on the surface of the foamed silicon carbide and encloses a part of the catalyst active components, which may decrease the volatilization of the activated carbon, reduce the active sites of the catalyst, adjust the activity of the catalyst and inhibit the reaction speed, thereby control the reaction temperature. On the other hand, the phosgenation reaction is mainly carried out in the pores/channels of surface of the activated carbon catalyst, the heat released by the reaction is partly absorbed by the alkali metal salt and by means of the moving of molten alkali metal salt on the surface of the silicon carbide skeleton, and the absorbed heat would be transferred to the reactor wall, which will increase the radial heat transfer coefficient, and reduce the temperature of the activated carbon surface. We modify the activated carbon coating/foamed silicon carbide structural catalyst by using the alkali metal salt, and thereby obtain the catalyst for preparing phosgene having significantly improved operation stability.

In the preparation of phosgene by using the alkali metal salt-modified activated carbon coating/foamed silicon carbide structural catalyst of the present invention, the radial temperature difference in the multi-tubular reactor of the fixed bed is <200° C.

In the method of the present invention, the temperature of the hot spot of <500° C. in the multi-tubular reactor of the fixed bed is achieved.

In the method of the present invention, by filling (packing) the alkali metal salt-modified activated carbon coating/foamed silicon carbide structural catalyst in the above-described four sections, the height of the part having reaction temperature in the range of 400~500° C. in the axial direction of the tubes is 40% or more of the total axial height of the tubes.

In the method of the present invention, by filling the alkali metal salt-modified activated carbon coating/foamed silicon carbide structural catalyst in the above-described four sections, the height of the part having the reaction temperature in the range of 250~500° C. in the axial direction of the tubes is 90% or more of the total axial height of the tubes.

The method for preparing phosgene using the activated carbon coating/foamed silicon carbide structural catalyst has not been reported so far. The present inventors first researched the use of the above-said catalyst for catalytic synthesis of phosgene in the gas phase. By supporting the activated carbon on the monolithic foamed silicon carbide as the support and adding the alkali metal salt component to the surface of the activated carbon coating/foamed silicon carbide structural catalyst, the loss and pulverization of the activated carbon are reduced, the life time of the catalyst is prolonged, and the radial temperature difference of the tubular (or multi-tubular) reactor of the fixed bed is eliminated. Secondly, by arranging the catalysts having different thickness of the activated carbon coating and different amount of the alkali metal salt in the axial direction of the tubes of the fixed bed, the content of the catalyst in the reaction initiation section is reduced, in order to achieve the purpose of reducing the synthesis reaction speed and of decreasing reaction exothermicity, avoid the formation of the vicious cycle of the reaction speed and the reaction temperature in the entry, and reduce the violent change of the temperature gradient of the bed. In addition, by adjusting the thickness of the activated carbon coating and the amount of the alkali metal salt in the rapid reaction section and the smooth transition section of the tubes, and adjusting the content of the reactive components at the different positions of the axial direction, the axial temperature difference of the catalyst bed is reduced, the synthesis reaction speed of the bed in the axial direction is slowed, the formation of the local hot spots is reduced, and the overall properties of the catalyst in the bed is fully exerted. At the same time, the carbonization, pulverization and loss of the activated carbon component due to the long-term operation at the hot spot temperature of 550~700° C. in the bed are avoided, and the uneven temperature of the heat transfer medium in the shell-side axial direction and the equipment material waste are avoided. Finally, by mixed loading the foamed silicon carbide catalyst containing the active component, i.e. the activated carbon and the foamed silicon carbide skeleton in the outlet temperature decreasing section, not only the temperature of the reactor outlet is lowered to prevent phosgene from decomposing, but also the content of free chlorine at the exhaust gas outlet is reduced, such that the content of free chlorine is up to standard after the exhaust gas is further reacted in the protective column. Since the temperature during the whole reaction is low, the formation of carbon tetrachloride from the reaction of the activated carbon and chlorine gas is prevented, such that the content of carbon tetrachloride in the exhaust gas is reduced and the quality of the phosgene product is improved.

BRIEF DESCRIPTION OF THE DRAWINGS

FIG. 1 shows a flow chart of the continuous process of the phosgene synthesis reaction;

FIG. 2 shows a schematic diagram of filling the alkali metal salt-modified activated carbon coating/foamed silicon carbide structural catalyst in the tubes of the fixed bed;

FIG. 3 shows a schematic diagram of the temperature change in the tubes of the fixed bed of Example 4;

FIG. 4 shows a schematic diagram of the temperature change in the tubes of the fixed bed of Example 5;

FIG. 5 shows a schematic diagram of the temperature change in the tubes of the fixed bed of Comparative Example 1;

FIG. 6 shows a schematic diagram of the temperature change in the tubes of the fixed bed of Comparative Example 2.

THE MODE OF CARRYING OUT THE INVENTION

The embodiments of the present invention are further described with reference to the Drawing and Examples. The present invention should not be interpreted to be limited to these examples, rather comprise all variations and modifications within the scope of the claims.

The main raw materials used in the Examples are obtained as follows.

Chlorine gas: manufactured from NINGBO REFINING & CHEMICAL COMPANY, Industrial grade.

Carbon monoxide: manufactured from WANHUA CHEMICAL (NINGBO) CO., LTD., Industrial grade.

The test method of the free chlorine in phosgene is described as follows:

(1) The Detection Principle is Based on the Following Reaction Formula:

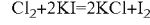

$Cl_2 + 2KI = 2KCl + I_2$

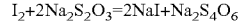

$I_2 + 2Na_2S_2O_3 = 2NaI + Na_2S_4O_6$ (2) Formulating and Titration with 0.1 Mol/L of $Na_2S_2O_3$ Solution About 6.2 g of $Na_2S_2O_3.5H_2O$ is weighed and dissolved in an appropriate amount of newly distilled water (which was just boiled and cooled to remove $O_2$ and $CO_2$ solved in water), and thereto 0.05~0.1 g $Na_2CO_3$ (which is used to inhibit microorganisms) is added to formulate 250 ml of a solution. The resulting solution is stored in a brown vial in the dark for 1~2 week(s) for titration.

0.15 g $K_2Cr_2O_7$ (baked for 2 hours at 110° C.) is precisely weighed into an iodine flask, to which 10-20 ml water is added to dissolve the $K_2Cr_2O_7$, and further 2 g KI and 10 ml $H_2SO_4$ are added. The flask is shook well and is allowed to stand for 5 minutes. Then, the content of the flask is diluted with 50 ml water and titrated with the above-described $Na_2S_2O_3$ solution. When the color of the solution changes to light yellowish green, 2 ml starch indicator is added, and titration is further conducted with the $Na_2S_2O_3$ solution until the color of the solution changes from blue to light green (the end point of titration is indicated by the very light green of $Cr^{3+}$). The titration is repeated three times in parallel and averaged.

(3) Analysis and Detection

Pressure equalizing: In a fume hood, turn the cork of a sampling bottle once quickly.

Freezing: the sampling bottle after pressure equalizing is slowly put in a refrigerator and frozen for 20 min Absorption: a sufficient amount of KI solution is formulated, the sampling bottle subjected to freezing is connected to a glass funnel with a flexible hose, and the KI solution is added into the glass funnel. When pulling the plug of the sampling bottle at the position of the flexible hose, the KI solution will naturally flow into the sampling bottle. When the KI solution no longer flows to the sampling bottle, the sampling bottle is rotated moderately in the fume hood to achieve sufficient absorption, and then the solution of the sampling bottle is poured to an Erlenmeyer flask.

Titration: the solution in the Erlenmeyer flask is titrated with the formulated standard $Na_2S_2O_3$ solution until the color is changed from purple to colourless.

The calculation formula of the free chlorine in phosgene is as follows:

$$Cl = \frac{V_1 \times C \times 35.5}{V_2}$$

Wherein:

Cl: the content of free chlorine, mg/L;

$V_1$: the volume of the standard $Na_2S_2O_3$ solution consumed by titrating the sample, ml;

$V_2$: the volume of the gas sampling bottle, L;

C: the actual concentration of the standard $Na_2S_2O_3$ solution, mol/L.

Method of measuring the content of carbon tetrachloride in phosgene:

The content of carbon tetrachloride in phosgene is measured by the on-line gas chromatography. The gas chromatograph is Hewlett Packard HP 5890 using a 105 m long, 0.25 mm I.D. column containing Restak™ RTX-1 Crossbond 100% dimethyl polysiloxane. Gas chromatographic conditions are the temperature be maintained at 50° C. for 10 minutes followed by temperature programming to 200° C. at a rate of 15° C./min Reactor: All the tubular (or multi-tubular) fixed bed reactors used in Examples and Comparative Examples comprise seven tubes, and every tube has a size of Φ60.3×5 mm, and a length of 3000 mm. The protective column has a size of Φ219×6 mm, and its length is 3000 mm. As shown in FIG. 1, chlorine gas and carbon monoxide are mixed in SMV type static mixer available from Sluzer Corporation rapidly and sufficiently, and then entered into the fixed bed reactor for phosgene synthesis. The tubes and the whole cylinder body of the fixed bed reactor are made from 316 stainless steel material. Boiling water is introduced into the shell side of the reactor, and its flow rate is based on the reaction exothermic rate calculated according to the feed amount of the reaction. The boiling water is vaporized and phasically changed into the by-produced steam, and thus absorbs the reaction heat conducted to the wall surface of the tubes and removes rapidly the heat released in the course of the reaction, so as to lower the radial temperature difference and at the same time eliminates the hot spots in the bed. The exhaust gas discharged from the outlet of the fixed bed reactor enters into the protective column and is further reacted. The quality of the phosgene product in the exhaust gas is ensured by the solid activated carbon particles packed in the protective column. The cylinder body of the protective column is made of 316 stainless steel material.

Foamed silicon carbide: preferably, the foamed silicon carbide is composed of 95 wt % silicon carbide and 5 wt % silicon and has polygonal closed ring basic units, and the basic units are connected to each other to form a three-dimensional interconnected network, with the through-hole rate of 98.9%, the mesh size of the network being 1 mm, and the relative density of the ceramic sinews constituting the polygonal closed ring being ≥99%. The average grain size is 1 mm, and the average pore size is 1 mm

EXAMPLE 1

(1) The foamed silicon carbide ceramic having the average pore size of 1 mm is immersed in 3 mol/L of NaOH solution for 10 minutes, and washed with water and then baked under air atmosphere of 120° C. for 3 hours;

(2) A suspension is prepared according to the proportion of phenolic resin:activated carbon:curing agent (hexamethylene tetramine):ethyl alcohol=100:50:2:100 on a weight basis, and a slurry is obtained by ball-milling said suspension for 1 hour;

(3) The foamed silicon carbide ceramic after washing and drying is immersed in the above-said slurry of the activated carbon for 5 minutes, and then is taken out and blown away the excess slurry from it using compressed air, and baking it under air atmosphere of 100° C.;

(4) Step (3) is repeated by using the baked product from the above step until the loading of the coating of the activated carbon reaches 200 g/L;

(5) The sample is heated to 700° C. at the speed of 2° C./minute under nitrogen atmosphere and maintained at the temperature for 0.5 hour, and then activated with carbon dioxide at 900° C. for 2 hours to form the activated carbon coating on the surface of the foamed silicon carbide with a coating amount of 125 g/L, thereby obtain the activated carbon coating/foamed silicon carbide structural catalyst having the activated carbon coating thickness of about 100 µm.

As an another example, steps (1)~(5) are repeated, but step (3) of immersing the foamed silicon carbide ceramic in the slurry of the activated carbon for 5 minutes is repeated until the loading of the coating of the activated carbon reaches 80 g/L. The sample is heated to 600° C. at the speed of 1° C./minute under nitrogen atmosphere and maintained at the temperature for 2 hour, and then activated with carbon dioxide at 800° C. for 2 hours to form the activated carbon coating on the surface of the foamed silicon carbide with a coating amount of 50 g/L, thereby obtain the activated carbon coating/foamed silicon carbide structural catalyst having the activated carbon coating thickness of about 50 µm.

As an another example, steps (1)~(5) are repeated, but step (3) of immersing the foamed silicon carbide ceramic in the slurry of the activated carbon for 5 minutes is repeated until the loading of the coating of the activated carbon reaches 300 g/L. The sample is heated to 700° C. at the speed of 3° C./minute under nitrogen atmosphere and maintained at the temperature for 0.5 hour, and then activated with carbon dioxide at 900° C. for 1 hours to form the activated carbon coating on the surface of the foamed silicon carbide with a coating amount of 200 g/L, thereby obtain the activated carbon coating/foamed silicon carbide structural catalyst having the activated carbon coating thickness of about 200 µm.

EXAMPLE 2

(1) The activated carbon coating/foamed silicon carbide structural catalyst prepared by Example 1 is immersed in 1.5 mol/L of aqueous sodium chloride (NaCl) solution for 4 hours, and washed with water and then baked under air atmosphere of 100° C.;

(2) Step (1) is repeated using the baked sample until the loading of NaCl reaches 50 g/L;

(3) The baked sample is calcined at 400° C. for 2 hours under the protection of nitrogen atmosphere to obtain sodium chloride (NaCl)-modified activated carbon coating/foamed silicon carbide structural catalyst having sodium chloride content of 30 g/L.

As an another example, steps (1)~(3) are repeated, but the activated carbon coating/foamed silicon carbide structural catalyst is immersed in 0.8 mol/L of NaCl aqueous solution for 2 hours to prepare the baked catalyst having the loading of sodium chloride of 0.6 g/L. The sample is calcined at 400° C. under the protection nitrogen atmosphere for 2 hours to obtain sodium chloride (NaCl)-modified activated carbon coating/foamed silicon carbide structural catalyst having sodium chloride content of 0.3 g/L.

As an another example, steps (1)~(3) are repeated, but the activated carbon coating/foamed silicon carbide structural catalyst is immersed in 0.8 mol/L of aqueous NaCl solution for 4 hours to prepare the baked catalyst having the loading of sodium chloride of 1.5 g/L. The sample is calcined at 400° C. under the protection of nitrogen atmosphere for 2 hours to obtain sodium chloride (NaCl)-modified activated carbon coating/foamed silicon carbide structural catalyst having sodium chloride content of 1 g/L.

As an another example, steps (1)~(3) are repeated, but the activated carbon coating/foamed silicon carbide structural catalyst is immersed in 1.5 mol/L of aqueous NaCl solution for 2 hours to prepare the baked catalyst having the loading of sodium chloride of 10 g/L. The sample is calcined at 400° C. under the protection of nitrogen atmosphere for 2 hours to obtain sodium chloride (NaCl)-modified activated carbon coating/foamed silicon carbide structural catalyst having sodium chloride content of 5 g/L.

EXAMPLE 3

(1) The activated carbon coating/foamed silicon carbide structural catalyst prepared by Example 1 is immersed in 1.5 mol/L of aqueous potassium chloride (KCl) solution for 2 hours, and washed with water and then baked under air atmosphere of 100° C.;

(2) Step (1) is repeated using the baked sample until the loading of KCl reaches 20 g/L;

(3) The baked sample is calcined at 500° C. for 1 hours under the protection of nitrogen atmosphere to obtain potassium chloride (KCl)-modified activated carbon coating/foamed silicon carbide structural catalyst having potassium chloride content of 15 g/L.

As an another example, steps (1)~(3) are repeated, but the activated carbon coating/foamed silicon carbide structural catalyst is immersed in 1.5 mol/L of aqueous KCl solution for 4 hours to prepare the baked catalyst having the loading of potassium chloride of 30 g/L. The sample is calcined at 400° C. under the protection of nitrogen atmosphere for 2 hours to obtain potassium chloride (KCl)-modified activated carbon coating/foamed silicon carbide structural catalyst having potassium chloride content of 20 g/L.

As an another example, steps (1)~(3) are repeated, but the activated carbon coating/foamed silicon carbide structural catalyst is immersed in 0.8 mol/L of aqueous KCl solution for 1 hour to prepare the baked catalyst having the loading of potassium chloride of 1.8 g/L. The sample is calcined at 400° C. under the protection of nitrogen atmosphere for 2 hours to obtain potassium chloride (KCl)-modified activated carbon coating/foamed silicon carbide structural catalyst having potassium chloride content of 1 g/L.

As an another example, steps (1)~(3) are repeated, but the activated carbon coating/foamed silicon carbide structural catalyst is immersed in 0.8 mol/L of aqueous KCl solution for 2 hours to prepare the baked catalyst having the loading of potassium chloride of 10 g/L. The sample is calcined at 400° C. under the protection of nitrogen atmosphere for 2 hours to obtain potassium chloride (KCl)-modified activated carbon coating/foamed silicon carbide structural catalyst having potassium chloride content of 5 g/L.

EXAMPLE 4

As shown in FIG. 2, the sodium chloride-modified activated carbon coating/foamed silicon carbide structural catalyst prepared in Example 2 is packed in the multi-tubes of the fixed bed in section, and reaction is conducted according to the scheme as shown in FIG. 1. In FIG. 2, "a" denotes reaction initiation section, wherein its length is 10% of the total length of the tube(s), the thickness of the active component i.e. the activated carbon supported on the surface of the foamed silicon carbide is 200 µm, and the content of sodium chloride is 0.3 g/L; "b" denotes rapid reaction section, wherein its length is 20% of the total length of the tube(s), the thickness of the active component i.e. the activated carbon supported on the surface of the foamed silicon carbide is 50 µm, and the content of sodium chloride is 30 g/L; "c" denotes smooth transition section, wherein its length is 50% of the total length of the tube(s), the thickness of the active component i.e. the activated carbon supported on the surface of the foamed silicon carbide is 100 µm, and the content of sodium chloride is 5 g/L; "d" denotes outlet temperature decreasing section, wherein its length is 20% of the total length of the tube(s), the thickness of the active component i.e. the activated carbon supported on the surface of the foamed silicon carbide is 100 µm, and the content of sodium chloride is 1 g/L.

The volume ratio of the feed carbon monoxide and chlorine gas is 1.05:1, and chlorine gas is fed at the rate of 5 $m^3$/hr. The pressure in the reactor system is 0.3 MPa. Superheated boiling water of 212° C. is introduced into the shell side of the fixed bed reactor, and high pressure steam of 2.0 MPa is produced by vaporization of the boiling water to remove the reaction heat. The schematic diagram of the temperature change in the tube(s) of the fixed bed is obtained as shown in FIG. 3. It can be seen that the height of the part having the reaction temperature in the range of 400~500° C. in the axial direction of the tube(s) is 51% of the total axial height of the tube(s), and the height of the part having the reaction temperature in the range of 250~500° C. in the axial direction of the tube(s) is 93% of the total axial height of the tube(s).

EXAMPLE 5

As shown in FIG. 2, the potassium chloride-modified activated carbon coating/foamed silicon carbide structural catalyst prepared in Example 3 is packed in the multi-tubes of the fixed bed in section, and reaction is conducted according to the scheme as shown in FIG. 1. In FIG. 2, "a" denotes reaction initiation section, wherein its length is 20% of the total length of the tube(s), the thickness of the active component i.e. the activated carbon supported on the surface of the foamed silicon carbide is 50 µm, and the content of potassium chloride is 1 g/L; "b" denotes rapid reaction section, wherein its length is 10% of the total length of the tube(s), the thickness of the active component i.e. the activated carbon supported on the surface of the foamed silicon carbide is 0 μm, and the content of potassium chloride is 20 g/L; "c" denotes smooth transition section, wherein its length is 40% of the total length of the tube(s), the thickness of the active component i.e. the activated carbon supported on the surface of the foamed silicon carbide is 200 μm, and the content of potassium chloride is 15 g/L; "d" denotes outlet temperature decreasing section, wherein its length is 30% of the total length of the tube(s), the thickness of the active component i.e. the activated carbon supported on the surface of the foamed silicon carbide is 50 μm, and the content of potassium chloride is 5 g/L.

The volume ratio of the feed carbon monoxide and chlorine gas is 1.01:1, and chlorine gas is fed at the rate of 5 m³/hr. The pressure in the reactor system is 0.2 MPa. Superheated boiling water of 180° C. is introduced into the shell side of the fixed bed reactor, and high pressure steam of 1.0 MPa is produced by vaporization of the boiling water to remove the reaction heat. The schematic diagram of the temperature change in the tube(s) of the fixed bed is obtained as shown in FIG. 4. It can be seen that the height of the part having the reaction temperature in the range of 400~500° C. in the axial direction of the tube(s) is 48% of the total axial height of the multi-tube, and the height of the part having the reaction temperature in the range of 250~500° C. in the axial direction of the tube(s) is 95% of the total axial height of the tube(s).

COMPARATIVE EXAMPLE 1

The multi-tubes of the fixed bed is filled with "inert agent coke 20 cm+columnar activated carbon catalyst particles 220 cm+inert agent coke 20 cm" in section. Warm water of 40~50° C. is introduced into the shell side of the reactor to remove the reaction heat. Other conditions are same as those of Example 1.

The schematic diagram of the temperature change in the multi-tube of the fixed bed is obtained as shown in FIG. 5. It can be seen that the height of the part having the reaction temperature above 400° C. in the axial direction of the tube(s) is 17% of the total axial height of the tube(s), and the height of the part having the reaction temperature above 250° C. in the axial direction of the tube(s) is 41% of the total axial height of the tube(s).

COMPARATIVE EXAMPLE 2

Example 1 is repeated except the activated carbon coating/foamed silicon carbide structural catalyst is not modified by sodium chloride.

The schematic diagram of the temperature change in the multi-tubes of the fixed bed is obtained as shown in FIG. 6. It can be seen that the height of the part having the reaction temperature above 400° C. in the axial direction of the tube(s) is 26% of the total axial height of the tube(s), and the height of the part having the reaction temperature above 250° C. in the axial direction of the tube(s) is 65% of the total axial height of the tube(s).

The data obtained in Examples and Comparative Examples is shown in Table 1.

TABLE 1 test data of Examples and Comparative Examples

| | Radial temperature difference ° C. | Hot spot temperature ° C. | Free chlorine (PPM) | Carbon tetra-chloride (PPM) | Safe and stable run time (hour) |
|---|---|---|---|---|---|
| Example 4 | 104 | 481 | 40 | 41 | >8000 |
| Example 5 | 104 | 488 | 45 | 39 | >8000 |
| Comparative Example 1 | 320 | 623 | 120 | 146 | <5000 |
| Comparative Example 2 | 104 | 542 | 89 | 102 | <6000 |

It can been seen from table 1 that, compared to the traditional process of the fixed bed reactor catalyzed by activated carbon, the process of the present invention can reduce the radial and axial temperature differences and the hot spot temperature of the bed by improving the properties of the catalyst and arranging the catalysts having different thickness of the activated carbon coating and different amount of the alkali metal salt in a particular form. Higher temperature of tube wall is obtained in the case of larger tube diameter, the reaction heat of phosgene synthesis can be utilized effectively, and higher quality of steam and high quality of phosgene are obtained stably. The method can reduce the pulverization and spallation of the catalyst effectively, prolong the life time of the catalyst, prolong the safe and stable operation cycle of the apparatus, and reduce operation and maintenance costs.

The invention claimed is:

1. A catalyst for preparing phosgene, wherein said catalyst is an alkali metal salt-modified activated carbon coating/foamed silicon carbide structural catalyst, and the activated carbon coating has the thickness of 0~800 μm, preferably 0.1~300 μm.

2. The catalyst according to claim 1, wherein: the amount of said alkali metal salt is 0.01~100 g/L, preferably 0.3~30 g/L, based on the volume of the catalyst.

3. The catalyst according to claim 2, wherein: said alkali metal salt is one or more selected from chlorides, nitrates and sulfates, preferably sodium chloride and/or potassium chloride.

4. A method for preparing the catalyst of claim 1, wherein: immersing the activated carbon coating/foamed silicon carbide structural catalyst in 0.5~2 mol/L, preferably 0.8~1.5 mol/L of the aqueous solution of the alkali metal salt, taking the catalyst out and drying; calcining the dried catalyst at 400~500° C. for 1~2 hours under nitrogen atmosphere, thereby obtaining the alkali metal salt-modified activated carbon coating/foamed silicon carbide structural catalyst.

5. A method for preparing phosgene by using the catalyst of claim 1 or the catalyst obtained by the method of claim 4, wherein: carbon monoxide and chlorine gas are reacted in the multi-tubular reactor of a fixed bed packed with the catalyst, wherein the catalyst is packed in the multi-tubular reactor of the fixed bed in section, thus divides the multi-tubular reactor of the fixed bed, from bottom to top of the reactor in the axial direction of it, as: a reaction initiation section (1), a rapid reaction section (2), a smooth transition section (3), and an outlet temperature decreasing section (4);
wherein,
the length of said reaction initiation section (1) is 10~20% of the total length of the tube(s), and in the reaction initiation section (1), the thickness of the activated carbon coating is 0~300 μm, preferably 50~200 μm, and the amount of the alkali metal salt is 0.1~5 g/L, preferably 0.3~1 g/L, based on the volume of the catalyst;

the length of said rapid reaction section (2) is 10~20% of the total length of the tube(s), and in the rapid reaction section (2), the thickness of the activated carbon coating is 0~100 μm, preferably 0~50 μm, and the amount of the alkali metal salt is 10~30 g/L, preferably 20~30 g/L, based on the volume of the catalyst;

the length of said smooth transition section (3) is 40~50% of the total length of the tube(s), and in the smooth transition section (3), the thickness of the activated carbon coating is 50~300 μm, preferably 100~200 μm, and the amount of the alkali metal salt is 5~20 g/L, preferably 5~15 g/L, based on the volume of the catalyst;

the length of said outlet temperature decreasing section (4) is 20~30% of the total length of the tube(s), and in the outlet temperature decreasing section (4), the thickness of the activated carbon coating is 0~300 μm, preferably 50~100 μm, and the amount of the alkali metal salt is 0.5~10 g/L, preferably 1~5 g/L, based on the volume of the catalyst.

6. The method according to claim 5, wherein: the volume ratio of carbon monoxide and chlorine gas is 1~1.05:1.

7. The method according to claim 5, wherein: the reaction pressure is 0~0.4 MPa, preferably 0.1~0.35 MPa.

8. The method according to claim 5, wherein: the heat transfer medium of the multi-tubular reactor of the fixed bed is boiling water, carbon tetrachloride, chlorobenzene, ortho-dichlorobenzene or toluene, preferably boiling water.

9. The method according to claim 5, wherein: the radial temperature difference in the multi-tubular reactor of the fixed bed is <200° C., the temperature of the hot spot is <500° C., the height of the part having the reaction temperature in the range of 400~500° C. in the axial direction of the tube(s) is 40% or more of the total axial height of the tube(s), and the height of the part having the reaction temperature in the range of 250~500° C. in the axial direction of the tube(s) is 90% or more of the total axial height of the tube(s).

* * * * *